United States Patent Office 3,801,642
Patented Apr. 2, 1974

3,801,642
PREPARATION OF AMINES FROM METAL ARYLOXIDES
Calvin J. Worrel, Detroit, Mich., assignor to Ethyl Corporation, Richmond, Va.
No Drawing. Continuation-in-part of application Ser. No. 748,918, July 31, 1968, now Patent No. 3,626,010. This application Sept. 11, 1970, Ser. No. 71,391
Int. Cl. C07c 85/02, 85/06
U.S. Cl. 260—581          13 Claims

ABSTRACT OF THE DISCLOSURE

Metal aryloxides in which the metal is an alkali metal, alkaline earth metal, aluminum, zinc, titanium, hafnium, zirconium, boron, lead, or niobium, are converted to aryl amines by reaction with either ammonia, hydrazine or primary or secondary amines at temperatures from 200–500° C. The reaction is promoted by the addition of a Friedel-Crafts catalyst such as aluminum chloride.

This application is a continuation-in-part of application Ser. No. 748,918, filed July 31, 1968 now U.S. 3,626,010.

BACKGROUND

The conversion of hydroxy aromatic compounds such as phenols to the corresponding aromatic amines has been accomplished in the past by such means as the Bucherer reaction, in which a hydroxy aromatic is reacted with aqueous ammonium sulfite or bisulfite. In British 619,877 a similar reaction is shown in which certain phenols are converted to the corresponding amine by reaction with ammonia and ammonium chloride. The reaction is reported to proceed in fair yield with phenols that are unsubstituted in their ortho positions. However, when attempted with o-substituted phenols, only trace amounts of amines were produced.

SUMMARY

This invention relates to a novel process for replacing an aromatic hydroxyl group with an amine group. This replacement is accomplished by forming a metal aryloxide from the corresponding aromatic hydroxy compound and reacting the metal aryloxide with ammonia, primary or secondary amines in the presence of a Friedel-Crafts catalyst at temperatures of from about 200–500° C.

DESCRIPTION OF THE PREFERRED EMBODIMENTS

A preferred embodiment of the invention comprises a process for aminating an aromatic compound, said process comprising reacting a nitrogen compound selected from the group consisting of ammonia and amines having at least one hydrogen atom bonded to an amine nitrogen atom with a metal aryloxide selected from the group consisting of alkali metal aryloxides, alkaline earth metal aryloxides, aluminum aryloxides, zinc aryloxides, titanium aryloxides, gallium aryloxides, hafnium aryloxides, zirconium aryloxides, boron aryloxides, lead aryloxides, and niobium aryloxides, in the presence of a promoter amount of a Friedel-Crafts catalyst and at a temperature of from about 200–500° C.

The metal aryloxides used in the process can be prepared by methods known in the art. For example, the corresponding hydroxy aromatic compound can be reacted with a phenoxide-forming metal reagent. Suitable reagents include the metals themselves, acidic metal halides, metal alkyls and metal alkyl halides. For instance, metallic sodium, potassium, aluminum, calcium, magnesium, strontium, barium and zinc will react with hydroxy aromatics such as phenols, naphthols, hydroxyphenanthrenes, hydroxyanthracenes and hydroxycyclopentanophenanthrenes by merely mixing the metal with the appropriate hydroxy aromatic and heating to around 200° C. Hydrogen is evolved during the reaction. Preferably the metals are in a high surface form such as granules, powder, turnings or foil. For example, phenol reacts with granular aluminum by merely mixing the two and heating to about 160° C. Addition of a small amount of mercuric chloride will amalgamate the aluminum and cause the reaction to proceed at lower temperatures down to around 100° C. Also, alkaline earth metals such as calcium and magnesium react readily with phenols, naphthols and other hydroxy-substituted polynuclear aromatics.

As stated above, the acidic metal halides can be used to generate the metal aryloxides. By acidic metal halides is meant the metal halides usually classified as Lewis acids. For example, zirconium tetrachloride, titanium tetrachloride, hafnium tetrachloride, and the like, react with hydroxy aromatics evolving hydrogen chloride and forming the corresponding metal aryloxide. When this route is followed the resultant aryloxides sometimes retain some of the halogen, but this does not interfere. For example, an aluminum aryloxide can be prepared by merely adding aluminum chloride to the hydroxy aromatic and allowing the hydrogen chloride formed to escape. When phenol is used the aluminum phenoxide formed is substantially diphenoxy aluminum chloride. If some water is present the phenoxide will be hydrolyzed to some extent. For example, if wet phenol is reacted with aluminum metal the resultant aluminum phenoxide will contain some diphenoxy aluminum hydroxide. Preferably the reaction should be carried out under substantially anhydrous conditions. There can be some water present but it should not be sufficient to hydrolyze the metal aryloxide reactant to the corresponding metal hydroxide.

Another method that can be employed is to react the appropriate metal oxide with the hydroxy aromatic while distilling out the water formed. For example, lead oxide or zinc oxide form lead or zinc aryloxides when heated with hydroxy aromatics.

Another useful method of making the starting metal aryloxide is to react a metal alkyl or metal alkyl halide with the hydroxy aromatic. For example, metal alkyls and metal alkyl halides such as triethyl aluminum, diethyl aluminum chloride, trimethyl aluminum, methyl aluminum sesquichloride, triisobutyl aluminum, diethyl zinc, ethyl zinc chloride, butyl lithium, amyl sodium, tetraethyllead, tetramethyllead, and the like, will react with hydroxy aromatics to form the corresponding metal aryloxide. Furthermore, metal hydrides are useful such as sodium hydride, aluminum hydride, diethyl aluminum hydride, boron hydrides, sodium aluminum hydride, sodium boro hydride, and the like.

The foregoing methods of making the metal aryloxides from the hydroxy aromatic are not equally applicable to all hydroxy aromatics. They are shown only to suggest typical procedures since metal aryloxides are known compounds and the methods of preparing them are well known in the art.

The process of this invention is generally applicable to a broad range of hydroxy aromatics since the only reaction site involves the hydroxyl group bonded to a benzene ring. The rest of the hydroxy aromatic can be anything as long as it does not contain other substituents which are reactive with the metal aryloxide groups formed or which would interfere with the formation of the metal aryloxide reaction site. For example, the aryl portion of the molecule may be a mono-, di- or tri-nuclear radical, or for that matter, can contain even more aryl groups. The aryl portion of the hydroxy aromatic may also be fused to other cyclic systems including heterocyclic systems such as those containing cyclo oxygen, nitrogen and sulfur rings. For example, the hydroxy aromatic can be any of the isomeric hydroxy-substituted derivatives of benzene, naphthalene, anthracene, phenanthrene, indene, isoindene, benzofuran, isobenzofuran, thionaphthene, indole, isoindole, indolenine, 2-isobenzazole, 1,2-benzodiazole, 1,3-benzodiazole, indiazene, 1,3-benzoisodiazole, 1,2,3-benzotriazole, benzisoxazole, benzoxadiazole, 1,2-benzopyran, 1,4-benzopyran, 1,2-benzopyrone, quinoline, isoquinoline, 1,3-benzodiazine, 1,2-benzisoxazine, acenaphthene, fluorene, dibenzopyrrole, xanthene, thianthrene, phenothiazine, phenoxazine, naphthacene, chrysene, pyrene, triphenylene, and the like, wherein the hydroxyl group is bonded to a nuclear carbon atom.

The process is also applicable to aryl hydroxy compounds having more than one hydroxyl radical bonded to a nuclear aromatic carbon atom. For example, the process can be applied to such polyhydroxy aromatics as hydroquinones, resorcinols, catechols, 1,3-dihydroxy naphthalenes, pyrogallols, phloroglucinols, and the like.

Substitutents other than hydroxyl groups may be present in the aromatic compounds as long as they do not interfere with the course of the reaction. That is to say, the other substituents should be relatively inert to ammonia, primary or secondary amines, metal aryloxides and the reagent used to convert the hydroxyl groups to metal aryloxides. For example, any of the previously-listed aromatics may be substituted in a variety of positions with alkyl radicals, aralkyl radicals, cycloalkyl radicals, chlorine, bromine, iodine, fluorine, nitro groups, and the like. A few representative examples of these using the simpler aromatic structure are p-chlorophenol, p-nitrophenol, β-bromo-α-naphthol, β-chloro-7-hydroxy-coumarone, 2-acetoxy-7-hydroxy-indolenine, 3-n-dodecyl-7-hydroxy-benzisoxazole, 4-nitro-8-hydroxy-1,2-benzopyran, 7-sec-octadecyl-8-hydroxy-isocoumarin, and the like.

The reaction proceeds very well when the hydroxy aromatic is a hydroxy-substituted mononucler aromatic. As previously, these phenol type materials can be substituted with other groups as long as they do not interfere with the course of the reaction. A preferred class of such mononucler hydroxy aromatics are those having the formula:

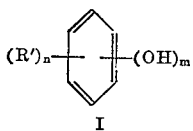

I wherein $n$ is an integer from 0–3, $m$ is an integer from 1–3, and R is selected from the group consisting of aliphatic alkyl radicals containing from 1–50 carbon atoms, aralkyl radicals containing from 7–20 carbon atoms and cycloalkyl radicals containing from 6–20 carbon atoms. Some examples of these are: phenol, catechol, resorcinol, pyrogallol, phluoroglucinol, hydroquinone, 3,5-di-tert-butylphenol, 2,6-di-tert-butyl-hydroquinone, 3-methyl catechol, p-cresol, m-crosol, p-pentacontyl phenol, 2,4-didocyl phenol, p-cyclohexyl phenol, 3-cyclooctyl phenol, p-(4-sec-dodecylcyclohexyl)phenol, 2,4,6-tri-methyl phluoroglucinol, m-sec-eicosyl phenol, p-(4-tert-tridecylbenzyl)phenol, 4-(3,5-di-sec-heptylcyclohexyl)phenol, and 2-sec-pentacontyl hydroquinone.

The advantages of the process over the prior art methods display themselves to a greater extent when the hydroxy aromatic is a mononuclear phenol in which at least one position ortho to the phenoxide oxygen atom is substituted with a radical selected from the group consisting of primary and secondary alkyl radicals containing from 1–50 carbon atoms, mononuclear aryl radicals containing from 6–20 carbon atoms, cycloalkyl radicals containing from 6–20 carbon atoms and primary and secondary aralkyl radicals containing from 7–20 carbon atoms. These are phenols having the formula:

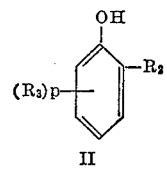

II wherein $p$ is an integer from 0–2, $R_2$ is selected from the group consisting of primary and secondary aliphatic alkyl radicals containing from 1–50 carbon atoms, primary and secondary aralkyl radicals containing from 7–20 carbon atoms, monouclear aryl radicals containing from 6–20 carbon atoms and cycloalkyl radicals containing from 6–20 carbon atoms, and $R_3$ is selected from the group consisting of aliphatic alkyl radicals containing from 1–50 carbon atoms, aralkyl radicals containing from 7–20 carbon atoms, mononuclear aryl radicals containing from 6–20 carbon atoms, and cycloalkyl radicals containing from 6–20 carbon atoms. When reacted with aryloxide-forming metal compounds these phenols form metal phenoxides which are substituted in the position ortho to the phenoxide oxygen atom. Some examples of the phenolic starting materials are:

o-sec-butylphenol,
2,5-dimethylphenol,
o-ethylphenol,
2,4,6-tri-sec-butylphenol,
2,4-dimethylphenol,
2(α-methylbenzyl)phenol,
2-cyclohexyl-p-cresol,
2(3,5-di-tert-butyl-cyclohexyl)-4-sec-eicosylphenol,
2-sec-pentacontylphenol,
2(α-methyl-4-dodecylbenzyl)phenol,
2-phenylphenol,
2(4-tetradecylphenyl)phenol,
2(3,5-di-sec-heptylphenyl)phenol,
2-triacontylphenol,
2-isopropylphenol,
2,4-di-sec-dodecylphenol, and
2(α-methyl-4-sec-amylbenzyl)phenol.

An especially valuable feature of this invention is its ability to replace an aromatic hydroxyl radical with an amine radical when both positions on the aromatic nucleus ortho to the hydroxyl group are substituted. When the aromatic hydroxy compound is a mononuclear phenol the phenolic reactant used in this embodiment of the invention has the formula:

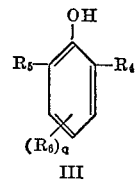

III wherein $q$ is 0 or 1, and $R_4$ and $R_5$ are selected from the same group as $R_2$ in Formula II, and $R_6$ is selected from the same group as $R_3$ in Formula II. Some examples of these phenols are:

2,6-dimethylphenol,
2,4,6-trimethylphenol,
2,6-di-sec-butylphenol,
2,6-di-sec-butyl-p-cresol,
2,4-dimethyl-6-butylphenol,
2,6-diisopropylphenol,
2,6-di-sec-octylphenol,
2,6-di(α-methylbenzyl)phenol,
6-ethyl-o-cresol,
6(α-methylbenzyl)-o-cresol,
6-isopropyl-o-cresol,
6-sec-butyl-o-cresol, 2,4-di-methyl-6-(2,3-benzobenzyl)phenol,
2(3-tert-butyl-5-isopropylbenzyl)phenol,
6-cyclooctyl-o-cresol,
2,6-dibornylphenol,
2,6-dicyclohexylphenol,
6-sec-pentacontyl-o-cresol,
2,4-dimethyl-6-docosylphenol,
6-phenyl-o-cresol,
2,4-dimethyl-6-(4-tetradecylphenyl)phenol,
2-ethyl-6-(3,5-diheptylphenyl)-p-cresol,
and the like.

The other reactant in the process is either ammonia, hydrazine or an amine having at least one hydrogen atom bonded to the amine nitrogen atom. These amines are generally referred to as primary or secondary amines. Examples of these amines are dimethyl amine, methyl amine, ethyl amine, diethyl amine, n-propyl amine, aniline, α-naphthyl amine, piperidine, morpholine, diethanol amine, ethanol amine, n-dodecyl amine, 2-docosyl amine, n-triacontyl amine, 1-pentacontyl amine, and the like.

From the foregoing, it can be seen that the useful amines have in common an amine group having at least one hydrogen atom bonded to the amino nitrogen atom as follows:

$$H-N<$$

As long as this group is present the remainder of the amine molecule is not critical. For example, the other groups attached to nitrogen can be hydrocarbon groups of only one carbon atom or may have molecular weights of 3000 or more. For example, high molecular weight alkyl amines made by chlorinating and polyolefin (e.g., polypropylene or polybutene having a molecular weight from about 200–10,000) and reacting the chlorinated polyolefin with ammonia to form the corresponding hydrocarbyl amine are useful. Thus, a useful class of amines can be depicted by the formula:

$$H-N\begin{matrix}R_7\\ \\R_8\end{matrix}$$

wherein $R_7$ is a hydrocarbon group containing from 1 to about 1000 carbon atoms and $R_8$ is hydrogen or the same as $R_7$. Further examples of these are eicosyl amines, docosyl amine, triacontyl amine, tetracontyl amine, pentacontyl amine, hexacontyl amine, heptacontyl amine, octacontyl amine, polybutene amines (molecular weight 1000), polypropylene amines (molecular weight 1400), cyclohexyl amines, cyclooctyl amines, 4-dodecylcyclohexyl amines, amino anthracene, amino chrysene, and the like.

Polyamines and polyalkylene amines are also useful. Examples of these amines are N,N-dimethyl-1,3-propanediamine, ethylene diamine, 1,6-hexane diamine, diethylene triamine, triethylene tetramine, tetraethylene pentamine, and the like. When amines having multiple NH or $NH_2$ groups available are used the process can be carried out in a manner to utilize more than one of the available amine groups. For example, the reaction of aluminum phenoxide and ethylene diamine can be carried out to form N,N'-diphenyl ethylene diamine. Likewise, 1,6-hexane diamine will form N,N'-diphenyl-1,6-hexane diamine. Likewise, tetraethylene pentamine will form a mixture in which the terminal nitrogen atoms are substituted with a phenyl radical. The most useful nitrogen compound in the process is ammonia.

Although the operation of the process is not dependent on knowledge of the mechanism, it is thought that the reaction proceeds according to the following equations. For simplicity, aluminum tris phenoxide is used as illustrative of all hydroxy aromatics including all the hydroxy derivatives and all homologs and isomers of the aromatic compounds previously listed.

(IV) $2Al(OC_6H_5)_3 + 3NH_3 \rightarrow 3C_6H_5NH_2 + 3C_6H_5OH + Al_2O_3$ (V) $2(C_6H_5O)_2AlCl + 3NH_3 \rightarrow 3C_6H_5NH_2 + C_6H_5OH + Al_2O_3 + 2HCl$ (VI) $Mg(OC_6H_5)_2 + NH_3 \rightarrow C_6H_5NH_2 + C_6H_5OH + MgO$ (VII) $2NaOC_6H_5 + NH_3 \rightarrow C_6H_5NH_2 + C_6H_5OH + Na_2O$ Alternatively, the process can be viewed as proceeding by the following reaction:

(VIII) $Al(OC_6H_5)_3 + 3NH_3 \rightarrow 3C_6H_5NH_2 + Al(OH)_3$

The above reactions illustrate the process carried out on metal aryloxides wherein the metals have valences of 1, 2 and 3. As shown above, not all of the hydroxy aromatic values present as metal aryloxides are converted to amines. Some, according to the above Equations IV–VII, can be converted back to the starting hydroxy aromatic. This can be readily recovered and recycled or excess metal aryloxide generating reagent can be added to raise conversions. The following reaction, in which aluminum metal in stoichiometric excess of that required to convert any phenolic hydroxyl groups to aluminum aryloxides, illustrates this embodiment of the invention.

(IX) $2Al(OC_6H_5)_3 2Al + 6NH_3 \rightarrow 6C_6H_5NH_2 + 2Al_2O_3 + 3H_2$

The above embodiment of the invention is readily carried out by mixing excess metal aryloxide generating compound with the hydroxy aromatic when first forming the metal aryloxide from the hydroxy aromatic. The use of excess metal in preparing the metal aryloxides is illustrated by the following equations, in which aluminum is reacted with phenol in stoichiometric excess of that required to convert the phenolic hydroxyl groups to aluminum aryloxides.

(X) $2Al + 3C_6H_5OH \rightarrow Al(OC_6H_5)_3 + Al$ (XI) $4AlCl_3 + 6C_6H_5OH \rightarrow 3(C_6H_5O)_2AlCl + AlCl_3 + 6HCl$ (XII) $2Al(C_2H_5)_3 + 3C_6H_5OH \rightarrow Al(OC_6H_5)_3 + Al(C_2H_5)_3 + 3C_2H_6$ The mixtures on the right side of the above equations are then merely reacted wih ammonia, primary or secondary amines to form an aryl amine in both high yield and conversion.

Although in the above illustrations only a relatively few compounds were employed, extension of these examples to the broad class of metal aryloxides and amines will be apparent to the skilled chemist based on the prior discussion. The reaction is basically quite simple and involves only the hydroxy radical on the hydroxy aromatic which is first converted to a metal aryloxide and a hydrogen atom on ammonia or the primary or secondary amine. The rest of the molecule is not directly involved and, hence, as long as it does not adversely affect the reaction, can be any of a wide range of aryl radicals. Therefore, it is readily apparent from the foregoing discussion that the reaction is of general application to hydroxy-substituted aromatics.

The stoichiometry of the reaction is shown in the above equations. From this, it is seen that from about 0.5 to 1.5 moles of ammonia or amine are required for each mole of metal aryloxide. In practice, it is preferred to use an excess of either ammonia or amine as this is generally the lowest cost material and helps force the reaction to completion. Also, the excess ammonia or amine is readily recovered. A useful range of ammonia or amine is from about 0.5 to 100 moles per mole of metal aryloxide, although greater or lesser amounts can be used without adverse effects.

The reaction requires elevated temperatures. The optimum temperature will vary somewhat depending on the particular metal aryloxide and nitrogen compound employed. This optimum temperature can be readily determined experimentally. In general, the reaction proceeds in the temperature range from about 200–500° C. A most useful temperature range is from 300–450° C.

The reaction is most conveniently conducted under an inert atmosphere in a sealed vessel at the vapor pressure of the reactants at the reaction temperature. If desired, the pressure can be increased by introduction of inert gas such as nitrogen in order to keep more reactants in the liquid phase.

Although a solvent is not required, one can be employed when desired. It should be relatively inert under the reaction conditions. Suitable solvents include hydrocarbons, ethers, and the like. Some examples of useful solvents are n-octane, benzene, toluene, xylene, mesitylene, diethyleneglycol diethyl ether, diethyleneglycol dibutyl ether, and the like. In some cases it is advantageous to add some of the anticipated aromatic amine product at the start of the reaction to act as a solvent for the metal aryloxide.

As stated previously, the reaction proceeds without adding a Friedel-Crafts catalyst. However, it has been found that the reaction rate, conversion and yield are improved by adding a Friedel-Crafts catalyst. Suitable Friedel-Crafts catalysts include those commonly used to catalyze the so-called Friedel-Crafts reaction, such as aluminum chloride, aluminum bromide, aluminum fluoride, boron trifluoride, boron trichloride, zinc chloride, stannic chloride, titanium tetrachloride, ferric chloride, cuprous chloride, hydrogen fluoride, hydrogen chloride, gallium trichloride, and the like. The most preferred are the aluminum halides, especially aluminum trichloride.

The amount of Friedel-Crafts reagent added should be sufficient to promote the reaction. As disclosed in application Ser. No. 748,918, the reaction of metal aryloxides with ammonia, primary or secondary amines proceeds without adding a Friedel-Crafts catalyst. Hence, by "promoter amount" is meant an amount such that the reaction proceeds to give higher yields and/or conversions or at a faster rate than would be obtained without adding the Friedel-Crafts catalyst. Promoter results are generally obtained using a mole of the Friedel-Crafts catalyst for each 1 to 150 moles of metal aryloxide (e.g, aluminum tris(2,6-dimethylphenoxide)) per mole of Friedel-Crafts catalyst (i.e., aluminum chloride).

The preferred temperature range when using the Friedel-Craft promoter is about the same as without the promoter. For example, good results are obtained from about 200–500° C. A more preferred range is from about 300–450° C. When carrying out the process using ammonia, aluminum 2,6-dimethylphenoxide and an aluminum chloride promoter best results are obtained around 375° C. Likewise, in this embodiment the preferred mole ratio of 2,6-dimethylphenol to aluminum used in the initial step of preparing the aluminum 2,6-dimethylphenoxide by reaction of aluminum metal with 2,6-dimethylphenol is from about 2.75:1 to 3.25:1. Likewise, the preferred mole ratio of the starting 2,6-dimethylphenol to the aluminum chloride is from about 10:1 to 60:1.

The process and manner of carrying it out are most readily understood by reference to the following examples. All parts are by weight unless otherwise specified.

EXAMPLE 1

This example illustrates the process carried out without the addition of the Friedel-Crafts catalyst.

In a pressure reaction vessel fitted with stirrer and heater was placed 293 parts of 2,6-dimethylphenol and 21.6 parts of flaked aluminum metal. The vessel was flushed with nitrogen and sealed. It was heated to 275° C. to form aluminum 2,6-dimethylphenoxide and then cooled to 50° C. The hydrogen which evolved in the reaction was vented. Following this, 70 parts of ammonia were added under pressure and the vessel again sealed. While stirring, the mixture was heated to 375° C., reaching a pressure of 1900 p.s.i.g. It was stirred at this temperature for 8 hours and then cooled. At room temperature the residual pressure was vented and the vessel was discharged after adding 1000 parts of hexane and 1000 parts of water. The product showed a 28.4 percent conversion of 2,6-dimethylphenol to 2,6-dimethyl aniline. After recovery of the starting 2,6-dimethylphenol, the yield was 86.5 percent, based on consumed 2,6-dimethylphenol.

EXAMPLE 2

This example illustrates the improved results obtained using a Friedel-Crafts promoter in the basic process.

In a pressure vessel as used in Example 1 was placed 293 parts of 2,6-dimethylphenol, 16.2 parts of granulated aluminum metal and 26.7 parts of anhydrous aluminum chloride. The vessel was flushed with nitrogen, sealed and heated to about 190° C. At this temperature a reaction occurred, causing a rapid temperature rise to 265° C. This reaction was the formation of aluminum 2,6-dimethylphenoxide. The vessel contents were then cooled and residual pressure (hydrogen) vented. Then, 70 parts of ammonia were added and the vessel again sealed and, while stirring, heated to 375° C. It was stirred at this temperature for 8 hours, following which it was cooled and vented. The reaction product was then removed from the vessel and hydrolyzed by addition of water. The hydrolysis mixture was extracted with hexane to obtain a 40 percent conversion starting 2,6-dimethylphenol to 2,6-dimethyl aniline. After correcting for recovered starting material, the actual yield of 2,6-dimethyl aniline was 85.8 percent.

EXAMPLE 3

To the reaction vessel as used in Example 1 was added 288 parts of 2,6-dimethylphenol, 20.5 parts of aluminum and 5.34 parts of anhydrous aluminum chloride. The vessel was sealed and heated to 165° C., at which temperature a reaction occurred causing a rapid increase to 203° C. The reaction mixture was cooled and residual pressure vented. Then, 75 parts of ammonia were added and the vessel sealed and, while stirring, heated to 375° C. It was stirred at this temperature for 8 hours, following which it was cooled and vented. The reaction mixture was discharged and hydrolyzed by stirring with water for one hour at 65° C. The hydrolysis mixture was extracted with hexane and the product, 2,6-dimethyl aniline, recovered by distillation. Conversion of starting 2,6-dimethylphenol to product was 47 percent and the yield was 87 percent.

EXAMPLE 4

In the reaction vessel as used in Example 1 was placed 293 parts of 2,6-dimethylphenol, 18 parts of aluminum and 17.8 parts of aluminum chloride. The reaction vessel was sealed and heated to 200° C., at which temperature a reaction occurred, causing the temperature to rise to 320° C. The vessel was then cooled and residual pressure vented. Then, 70 parts of ammonia were added and the vessel heated to 375° C. It was stirred at this temperature for 8 hours, following which it was cooled, vented and the product recovered as in the previous example. The conversion of starting phenol to 2,6-dimethyl aniline was 40 percent with an over-all yield of 81.7 percent.

The foregoing example can be carried out using primary or secondary amines in place of the ammonia. For example, when methyl amine is used the product is N-methyl-2,6-dimethyl aniline. Likewise, other Friedel-Crafts catalysts can be beneficially employed, such as aluminum bromide, boron trifluoride, boron trichloride, zinc chloride, stannic chloride, and any of the others previously described.

EXAMPLE 5

The reaction vessel described in Example 1 was charged with 293 parts of 2,6-dimethylphenol, 19.44 parts of aluminum and 10.65 parts of anhydrous aluminum chloride. The vessel was sealed and heated to 215° C., after which the exothermic reaction caused the temperature to reach 305° C. The reaction vessel was cooled and residual pressure was vented. Then, 70 parts of ammonia were charged and the vessel was heated to 375° C. After it was stirred at 375° C. for 8 hours, the vessel was cooled and vented. The reaction mixture was discharged using 100 parts of heptane and 300 parts of water. This was added to 300 parts of concentrated hydrochloric acid, giving an acidic aqueous layer and a heptane solvent layer. These layers were separated, and the aqueous layer was made strongly alkaline with sodium hydroxide to obtain 2,6-dimethyl aniline. Conversion of starting 2,6-dimethylphenol was 48.7 percent. Unconverted 2,6-dimethylphenol was recovered from the heptane layer, so that the actual yield of 2,6-dimethyl aniline based on consumed 2,6-dimethylphenol was 94.5 percent.

EXAMPLE 6

In the high pressure reaction vessel used in Example 1 place 206 parts of 2,6-di-sec-butylphenol and 100 parts of xylene. Flush the vessel with nitrogen and maintain a nitrogen atmosphere while adding a solution of 40 parts of triethyl aluminum in 100 parts of xylene, at 35–50° C., over a one hour period. Allow the evolved ethane to vent during the addition. Stir the mixture at 75–80° C. for an hour, and then cool to room temperature. Add 6.5 parts of aluminum chloride and 170 parts of ammonia under pressure and seal the vessel. While stirring, heat the mixture to 400° C. and stir at this temperature for 6 hours. Cool to room temperature and vent. Wash with hot water and distill the mixture to obtain 2,6-di-sec-butyl aniline.

Other hydroxy aromatics can be substituted for the 2,6-di-sec-butylphenol in the above example to obtain the corresponding aromatic amine. For instance, α-naphthol yields α-naphthyl amine. Likewise, p-chloro-2,6-dimethylphenol forms p-chloro-2,6-dimethyl aniline. The following table lists the starting hydroxy aromatic and the product obtained when following the above procedure.

| Ex. | Hydroxy aromatic | Aromatic amine product |
|---|---|---|
| 7 | β-Naphthol | β-Naphthyl amine. |
| 8 | p-Cresol | p-Methyl aniline. |
| 9 | p-Pentacontyl phenol | p-Pentacontyl aniline. |
| 10 | o-(α-Methylbenzyl)phenol | o-(α-Methylbenzyl) aniline. |
| 11 | 2,6-dicyclohexylphenol | 2,6-dicyclohexyl aniline. |
| 12 | 2,4,6-tri-tert-butylphenol | 2,4,6-tri-tert-butyl aniline. |
| 13 | 7-hydroxy indene | 7-amino indene. |
| 14 | 4,6-dibromo-7-hydroxy indene | 4,6-dibromo-7-amino indene. |
| 15 | 4-hydroxy benzofuran | 4-amino benzofuran. |
| 16 | 2-cyclooctyl-p-cresol | 2-cyclooctyl-4-methyl aniline. |
| 17 | p-phenylphenol | p-phenyl aniline. |
| 18 | p-(3,5,-di-sec-heptyl-phenyl)phenol | p-(3,5-di-sec-heptylphenyl) aniline. |
| 19 | o-(1-methylcyclohexyl)phenol | o-(1-methylcyclohexyl)aniline. |
| 20 | 2-sec-butyl-4,6-dinitrophenol | 2-sec-butyl-4,6-dinitro aniline. |
| 21 | 2,6-di-tert-butylphenol | 2,6-di-tert-butyl aniline. |
| 22 | 2,6-diisopropylphenol | 2,6-diisopropyl aniline. |
| 23 | 7-hydroxy indole | 7-amino indole. |
| 24 | 7-hydroxy-4-nitroisobenzofuran | 7-amino-4-nitro-isobenzofuran. |
| 25 | 4-hydroxy-7-acetoxy indolenine | 4-amino-7-acetoxy indolenine. |
| 26 | 7-hydroxy-4-methoxy-isothionaphthene | 7-amino-4-methoxy-isothionaphthene. |
| 27 | 4-hydroxy-benzoisoxazole | 4-amino-benzoisoxazole. |
| 28 | 7-hydroxyl-4-iodo-benzoisoxazole | 7-amino-4-iodo-benzoisoxazole. |
| 29 | 6-hydroxy coumarin | 6-amino coumarin. |
| 30 | 6-hydroxy-8-fluorocoumarin | 6-amino-8-fluorocoumarin. |
| 31 | 2-methyl-α-naphthol | 2-methyl-α-naphthyl amine. |
| 32 | 2-(α,α-dimethylbenzyl)-α-naphthol | 2-(α,α-dimethylbenzyl)-α-naphthyl amine. |
| 33 | 6,8-dichloro-β-naphthol | 6,8-dichloro-β-naphthyl amine. |
| 34 | 2,4-dinitro-α-naphthol | 2,4-dinitro-α-naphthyl amine. |
| 35 | 6-hydroxy quinoline | 6-amino quinoline. |
| 36 | 4-hydroxy acenaphthene | 4-amino acenaphthene. |
| 37 | 4-hydroxy-7-methylacenaphthene | 4-amino-7-methyl acenaphthene. |
| 38 | 4-hydroxy-6,8-dinitroacenaphthene | 4-amino-6,8-dinitro acenaphthene. |
| 39 | 4-hydroxy-6,8-dibromoacenaphthene | 4-amino-6,8-dibromo acenaphthene. |
| 40 | 1-hydroxy fluorene | 1-amino fluorene. |
| 41 | 1-hydroxy-2,4-di-sec-amyl fluorene | 1-amino-2,4-di-sec-amyl fluorene. |
| 42 | 2-hydroxy-6,8-difluoro fluorene | 2-amino-6,8-difluoro fluorene. |
| 43 | 1-hydroxy-dibenzopyrrol | 1-amino-dibenzopyrrol. |
| 44 | 1-hydroxy-2-ethyl-dibenzopyrrol | 1-amino-2-ethyl-dibenzopyrrol. |
| 45 | 1-hydroxy-2,4-diisopropyl dibenzopyrrol | 1-amino-2,4-diidopropyl dibenzopyrrol. |
| 46 | α-Hydroxy anthracene | α-Amino anthracene. |
| 47 | α-Hydroxy-2-phenyl anthracene | α-Amino-2-phenyl anthracene. |
| 48 | α-Hydroxy-2-(2,4-di-sec-heptylphenyl)anthracene | α-Amino-2-(2,4-sec-heptylphenyl)anthracene. |
| 49 | β-Hydroxy anthracene | β-Amino anthracene. |
| 50 | 9-hydroxy anthracene | 9-amino anthracene. |
| 51 | α-Hydroxy-6-dodecyl anthracene | α-Amino-5-dodecyl anthracene. |
| 52 | α-Hydroxy-5-triacontyl anthracene | α-Amino-5-triacontyl anthracene. |
| 53 | α-Hydroxy-8-pentacontyl anthracene | α-Amino-8-pentacontyl anthracene. |
| 54 | α-Hydroxy-2,4-dinitro anthracene | α-Amino-2,4-dinitro anthracene. |
| 55 | α-Hydroxy-2,4-dichloro anthracene | α-Amino-2,4-dichloro anthracene. |
| 56 | 3-hydroxy phenanthrene | 3-amino phenanthrene. |
| 57 | 3-hydroxy-2-ethoxy phenanthrene | 3-amino-2-ethoxy phenanthrene. |
| 58 | 3-hydroxy-7-chloro phenanthrene | 3-amino-7-chloro phenanthrene. |
| 59 | 3-hydroxy-8-methyl phenanthrene | 3-amino-8-methyl phenanthrene. |
| 60 | 3-hydroxy-5-nitro phenanthrene | 3-amino-5-nitro phenanthrene. |
| 61 | 2-hydroxy-8-(α-methylbenzyl)phenanthrene | 2-amino-8-(α-methylbenzyl) phenanthrene. |
| 62 | 8-hydroxy phenanthrene | 8-amino phenanthrene. |
| 63 | 8-hydroxy-cyclopentano phenanthrene. | 8-amino-cyclopentano phenanthrene. |
| 64 | 1-hydrozy xanthrene | 1-amino xanthrene. |
| 65 | 1-hydroxy phenazine | 1-amino phenazine. |
| 66 | 3-ethyl-4,5,7-trihydroxy coumarin | 3-ethyl-4,5,7-triamino coumarin. |
| 67 | 3-n-propyl-4,7,8-trihydroxy coumarin | 3-n-propyl-4,7,8-triamino coumarin. |
| 68 | 3-n-butyl-4,5,7-trihydroxy coumarin | 3-n-butyl-4,5,7-triamino coumarin. |
| 69 | 3-n-butyl-4,7,8-trihydroxy coumarin | 3-n-butyl-4,7,8-triamino coumarin. |
| 70 | 3-phenyl-4,7,8-trihydroxy coumarin | 3-phenyl-4,7,8-triamino coumarin. |
| 71 | 3-(1-naphthylmethyl)-4,5,7-trihydroxy coumarin | 3-(1-naphthylmethyl)-4,5,7-triamino coumarin. |
| 72 | 3-(1-naphthylmethyl)-4,7,8-trihydroxy coumarin | 3-(1-naphthylmethyl)-4,7,8-triamino coumarin. |
| 73 | 3-[2-(β-pyridyl)ethyl]-4,5,7-trihydroxy coumarin | 3-[2-(β-pyridyl)ethyl]-4,5,7-triamino coumarin. |
| 74 | 4,4'-methylenebis(2,6-dimethylphenol) | 4,4'-methylenebis(2,6-dimethylaniline). |
| 75 | 4,4'-bis(2,6-dimethylphenol) | 4,4'-bis(2,6-dimethyl aniline). |

EXAMPLE 76

In the pressure reaction vessel of Example 1 place 144 parts of β-naphthol in 25 parts of magnesium turnings. The vessel is sealed and the mixture heated to 200° C. to form a mixture of magnesium naphthoxide and unreacted magnesium turnings. After cooling to room temperature, the evolved hydrogen is vented and 13 parts of aluminum bromide and 120 parts of n-butyl amine added. The vessel is flushed with nitrogen, sealed, and while stirring, heated to 450° C. It is stirred at this temperature for 2 hours and then cooled to 30° C. Residual pressure is vented and 100 parts of toluene added. The mixture is stirred, warmed to 50° C. and discharged. The solution is washed with water and then extracted with hot 20 percent aqueous sodium hydroxide until the unreacted β-naphthol is removed. It is then heated to 50° C. at 2 mm. Hg to distill out residual water and solvent, leaving as the product β-naphthyl amine in excellent yield and conversion.

In the above example good results are obtained when equal mole quantities of other primary or secondary amines are used in place of the n-butyl amine. The following table lists various amine reactants which may be substituted in the above example together with the product which they will yield.

| Ex. | Amine reactant | Product |
| --- | --- | --- |
| 77 | Dimethyl amine | N,N-dimethyl naphthyl amine. |
| 78 | Ethanol amine | N-ethanol naphthyl amine. |
| 79 | Diethanol amine | N,N-diethanol naphthyl amine. |
| 80 | N,N-dimethyl-1,3-propane diamine. | N,N-dimethyl-N'-naphthyl-1,3-propane diamine. |
| 81 | Piperidine | N-naphthyl piperidine. |
| 82 | Morpholine | N-naphthyl morpholine. |
| 83 | Dodecyl amine | N-dodecyl naphthyl amine. |
| 84 | Eicosyl amine | N-eicosyl naphthyl amine. |
| 85 | Pentacontyl amine | N-pentacontyl naphthyl amine. |
| 86 | Cyclohexyl amine | N-cyclohexyl naphthyl amine. |
| 87 | Diacrylonitrile amine | N,N-diacrylonitrile naphthyl amine. |

EXAMPLE 88

In the reaction vessel of Example 1 place 156.5 parts of 2,6-dimethyl-p-chlorophenol and 100 parts of xylene. Flush the vessel with nitrogen and over a 30 minute period, at 25–30° C. add 123 parts of diethyl zinc. Stir for 30 minutes at 30–35° C., and then heat to 100° C. and stir for one hour. Cool to room temperature and vent. Add 13.6 parts of anhydrous zinc chloride and 34 parts of ammonia and seal. While stirring, heat to 250° C. and hold at this temperature for 16 hours. Cool and vent. Discharge into 1000 parts of water, separate the organic phase and distill to recover the product, 2,6-dimethyl-4-chloro-aniline.

EXAMPLE 89

In the reaction vessel of Example 1 place 194 parts of 2-hydroxy phenanthrene and 250 parts of toluene. While stirring, heat the mixture to 100° C. and, under a nitrogen atmosphere, add a solution of 160 parts of tetraethyllead in 100 parts of toluene. Heat the mixture to reflux and hold at reflux for 4 hours. Cool to room temperature and add 12 parts of boron trifluoride and 80 parts of ammonia. Seal the vessel and, while stirring, heat to 400° C. Stir at 400–425° C. for 2 hours and then cool to room temperature. Filter the reaction mass to remove metallic lead and lead oxide and then extract with hot concentrated hydrochloric acid. Neutralize the acid extract phase to recover 2-amino phenanthrene.

EXAMPLE 90

In the reaction vessel of Example 1 place 366 parts of o-ethylphenol and slowly add 270 parts of aluminum chloride, keeping the temperature at 35–40° C. and bubbling nitrogen through the mixture during the addition. Following this, add an additional 20 parts of aluminum chloride. Over a one-hour period, at 35–40° C., add 170 parts of ammonia and seal the vessel. While stirring, heat to 400° C. and stir at that temperature for 4 hours. Cool to room temperature and vent. Wash the reaction mass with 10 percent aqueous sodium hydroxide and distill the organic phase to recover o-ethyl aniline.

EXAMPLE 91

In the reaction vessel of Example 1 place a dispersion of 23 parts of metallic sodium in 100 parts of xylene under a nitrogen atmosphere. While stirring vigorously, add a xylene solution of 132 parts of 7-hydroxy indene over a one-hour period, at 35–40° C., allowing the evolved hydrogen to escape. Stir at 50–60° C. for an hour, or until all the sodium has reacted, and then cool to room temperature. Flush with nitrogen to remove the remaining hydrogen. Add 16 parts of stannic chloride. Seal the vessel and pressurize with 60 parts of ammonia. While stirring, heat to 375° C. and stir at that temperature for 4 hours. Cool to room temperature and discharge. Filter and wash the filtrate with water. Extract the organic phase 3 times with 500 parts of hot 10 percent aqueous sodium hydroxide. Distill the remaining organic phase under vacuum to recover 7-amino indene.

Following the general procedure of the above example, other alkali metals can be employed to convert any of the forementioned hydroxy aromatics to their corresponding amino aromatic. Instead of using the metal dispersion to form the initial aryloxide, it is sometimes more convenient to use the alkali metal alkyl such as butyl lithium, amyl sodium or amyl potassium.

EXAMPLE 92

To the reaction vessel of Example 1 add 300 parts of 2-(α-methylbenzyl)-4-dodecylphenol and 500 parts of xylene. Maintain a nitrogen atmosphere and, while stirring, add 38 parts of sodium borohydride at 35–40° C. over a one hour period. Stir at 35–40° C. for an hour, and then at 65–70° C. for 30 minutes. Cool to room temperature and add 6 parts of anhydrous boron trichloride and 80 parts of ammonia. Seal and, while stirring, heat to 390° C. and stir at this temperature for 4 hours. Cool to room temperature and vent. Wash the reaction mass with water and extract with hot concentrated hydrochloric acid. Neutralize the hydrochloric acid with sodium carbonate to precipitate 2-(α-methylbenzyl)-4-dodecyl aniline.

Other hydrides can be used to prepare the starting aryloxide. For example, sodium hydride, lithium hydride, calcium hydride, borohydride, sodium aluminum hydride, lithium aluminum hydride, and the like, can be used with good results.

EXAMPLE 93

To the reaction vessel of Example 1 add 264 parts of titanium catecholate made by reacting titanium tetrachloride with catechol. Add 500 parts of xylene and flush with nitrogen. Add 10 parts of aluminum bromide. Seal and pressurize with 120 parts of ammonia. While stirring, heat to 400° C. and stir at that temperature for 2 hours. Cool, vent and discharge. Extract with 10 percent aqueous sodium hydroxide to remove unreacted catechol. Filter the remaining organic phase and distill off the xylene, leaving 1,2-diamino benzene.

Other polyhydroxy aromatics can be used in the process such as hydroquinones, 2,6-di-tert-butyl-hydroquinone, pyrogallol, phloroglucinol, and the like.

EXAMPLE 94

To the reaction vessel of Example 1 add 980 parts of zirconium 4-bromo-α-naphthoxide made from tetra-butylzirconate and 4-bromo-α-naphthol. Add 2000 parts of xylene, 35 parts of gallium chloride and 500 parts of n-dodecyl amine. Flush with nitrogen, seal and heat to 375° C. After stirring at 375–400° C. for 6 hours, cool and discharge. Extract any unreacted 4-bromo-α-naphthol with hot aqueous sodium hydroxide and then distill off the xylene solvent, leaving 4-bromo-α-naphthyl amine.

Following the above procedure, any of the previously-described hydroxy aromatics can be converted to the corresponding amine using either the zirconium aryloxide intermediate or other metal aryloxide intermediates such as the corresponding hafnium or niobium aryloxides.

Hydrazine can be used in the process in place of ammonia. The product is either a hydrazino or hydrazo derivative. For example, 2,6-dimethylphenol when converted to its aluminum phenoxide reacts with hydrazine to 2,6-dimethylphenyl-hydrazine and di-(2,6 - dimethylphenyl)-hydrazine. Operating conditions are as previously described.

The aromatic amines made by this process are useful for a variety of purposes. They are intermediates for antioxidants, antiozonants, dyes, herbicides and insecticides.

The lower molecular weight gasoline-soluble aniline derivatives are useful antiknock agents for spark ignited internal combustion engines (Ind. Eng. Chem., 47, page 2141, 1955). For example, N-methyl aniline made from aluminum phenoxide and methyl amine by the process of this invention is an excellent antiknock agent. Likewise, 2,4-dimethyl aniline made from aluminum 2,4-dimethyl phenoxide and ammonia is also a very effective antiknock agent. In this use, they are added to a liquid hydrocarbon fuel of the gasoline boiling range in an antiknock amount, generally from 0.25 to 1 percent.

In U.S. 3,322,810 is described certain 2,6-dialkyl isothiocyanates which are useful as pesticides. The isothiocyanates are made by reacting carbon disulfide with a 2,6-dialkyl aniline. These anilines are readily made by the present process. For example, 2,6-dimethyl aniline is made in good yield from the corresponding 2,6-dimethylphenol, as shown in Example 2.

The compounds made by this invention are also intermediates in the manufacture of polyurethanes. These polymers are made by reacting aromatic diisocyanates with polyhydroxy compounds. The diisocyanates are in turn made by the reaction of diamino aromatics with phosgene. The present invention provides a good process for the preparation of the diamino aromatic from the corresponding dihydroxy aromatic. For example, 4,4'-diisocyanato-3,3',5,5'-tetramethyl diphenylmethane is readily made by either (1) reacting the aluminum aryloxide of 4,4'-dihydroxy-3,3',5,5'-tetramethyl diphenylmethane with ammonia at 200–500° C., or (2) reacting aluminum 2,6-dimethyl phenoxide with ammonia to form 2,6-dimethyl aniline and subsequently coupling this aniline at the 4 position through a methylene bridge by reaction with formaldehyde.

Phenyl β-naphthyl-amine made according to the present process by reacting aniline with aluminum tris-(β-naphthoxide) is a commercial rubber antioxidant sometimes designated "PBNA."

I claim:

1. In the process for aminating an aromatic compound, said process comprising reacting ammonia with a metal aryloxide excluding other cyclic systems selected from the group consisting of alkali metal, alkaline earth metal, aluminum, zinc, titanium, gallium, hafnium, zirconium, boron, lead and niobium non-heterocyclic aryloxides at a temperature of from about 200–500° C., the improvement comprising conducting said process in the presence of a promoter amount of a Friedel-Crafts catalyst.

2. A process of claim 1 wherein said metal aryloxide is an aluminum aryloxide.

3. A process of claim 2 wherein said Friedel-Crafts catalyst is aluminum chloride.

4. A process of claim 2 wherein said aluminum aryloxide is an aluminum phenoxide.

5. A process of claim 4 wherein said Friedel-Crafts catalyst is aluminum chloride.

6. A process of claim 4 wherein the phenoxide groups of said aluminum phenoxide are substituted in at least one nuclear position ortho to the phenoxide oxygen atom with a radical selected from the group consisting of primary and secondary alkyl radicals containing from 1 to about 50 carbon atoms, mononuclear aryl radicals containing from 6 to about 20 carbon atoms, cycloalkyl radicals containing from 6 to about 20 carbon atoms and primary and secondary aralkyl radicals containing from 7 to about 20 carbon atoms.

7. A process of claim 4 wherein the phenoxide radicals of said aluminum phenoxide are substituted in both nuclear positions ortho to the phenoxide oxygen atom with radicals independently selected from the group consisting of primary and secondary alkyl radicals containing from 1 to about 50 carbon atoms, mononuclear aryl radicals containing from 6 to about 20 carbon atoms, cycloalkyl radicals containing from 6 to about 20 carbon atoms and primary and secondary aralkyl radicals containing from 7 to about 20 carbon atoms.

8. A process of claim 7 wherein said aluminum phenoxide is an aluminum 2,6-dimethylphenoxide.

9. A process of claim 7 wherein said aluminum phenoxide is an aluminum 2,6-diisopropylphenoxide.

10. A process of claim 6 wherein said nitrogen compound is ammonia and said Friedel-Crafts catalyst is aluminum chloride.

11. A process of claim 7 wherein said Friedel-Crafts catalyst is aluminum chloride.

12. A process of claim 11 wherein said aluminum phenoxide is an aluminum 2,6-dimethylphenoxide.

13. A process of claim 12 carried out in the presence of aluminum metal.

References Cited

FOREIGN PATENTS 619,877    3/1949    Great Britain    260—581

ROBERT V. HINES, Primary Examiner

U.S. Cl. X.R.

260—77.5, 243 A, 244 R, 247, 256.4 N, 288 R, 293 R, 298, 307 H, 308 B, 309.2, 317, 319.1, 326.1, 326.3, 326.85, 327 R, 330.5, 335, 345.2, 346.2 R, 429 R, 429.3, 429.5, 448, 465 E, 569, 570 R, 570 D, 570.5 P, 573, 576, 577, 578

UNITED STATES PATENT OFFICE
CERTIFICATE OF CORRECTION

Patent No. 3,801,642     Dated April 2, 1974

Inventor(s) Calvin J. Worrel

It is certified that error appears in the above-identified patent and that said Letters Patent are hereby corrected as shown below:

Column 6, line 30:
"$2Al(OC_6H_5)_32Al + 6NH_3 \rightarrow 6C_6H_5NH_2 + 2Al_2O_3 + 3H_2$" should read -- $2Al(OC_6H_5)_3 + 2Al + 6NH_3 \rightarrow 6C_6H_5NH_2 + 2Al_2O_3 + 3H_2$ --

Signed and sealed this 10th day of September 1974.

(SEAL)
Attest:

McCOY M. GIBSON, JR.
Attesting Officer

C. MARSHALL DANN
Commissioner of Patents